United States Patent Office 3,669,608
Patented June 13, 1972

3,669,608
PROCESS FOR COLORING NATURAL AND SYNTHETIC POLYAMIDE FIBERS IN THE PRESENCE OF IMIDAZOLINE COMPOUNDS
Hans Wegmuller, Riehen, Alois Kleemann, Basel, and Rudolf Keller, Riehen, Switzerland, assignors to Ciba-Geigy AG, Basel, Switzerland
No Drawing. Filed Sept. 15, 1969, Ser. No. 858,111
Claims priority, application Switzerland, Sept. 19, 1968, 14,063/68
Int. Cl. D06p 3/14
U.S. Cl. 8—54
18 Claims

ABSTRACT OF THE DISCLOSURE

Process for the dyeing and printing of natural and synthetic polyamide fibres with a dye liquor which liquor contains an anionic reactive dye, a compound of the formula

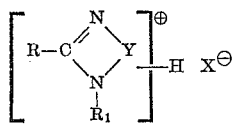

wherein

R represents an aliphatic hydrocarbon radical having 11 to 23 carbon atoms in the main chain,
$R_1$ represents hydrogen, an unsubstituted or substituted lower alkyl group, or an unsubstituted or substituted phenyl group,
Y represents, together with the

group, the radical of a partially saturated diazole or diazine ring, and
X represents the anion of an inorganic or organic acid, and optionally a non-ionogenic and/or anion-active tenside, as well as further auxiliary agents;
premixed dye assistant composition suitable therefore and dye liquor containing the aforesaid compound.

DESCRIPTION OF THE INVENTION

The present invention relates to a process for the dyeing and printing of natural and synthetic polyamide fibres using reactive dyestuffs, the dye liquor used in the process and also the material dyed or printed according to this process.

Several processes have already been suggested for the dyeing and printing of polyamide fibres using reactive dyestuffs in the presence of surface-active auxiliary agents. The dyeings obtained by these known processes lack, however, the desired colour strength, evenness and/or dye penetration of the fibre material, as well as certain fastness properties such as, e.g. fastness to rubbing.

A process has now been found enabling even dyeings, having fastness to wet processing, to be produced with reactive dyestuffs on natural and synthetic polyamide fibres, especially on wool, with appreciable exhaustion of the dye bath and the attainment of high fixing values. The process is characterised by dyeing or printing the natural or synthetic polyamide fibres with an aqueous dye liquor containing:

At least one anionic reactive dyestuff,

A compound of the general Formula I

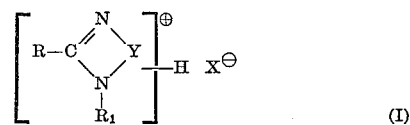

wherein

R represents an aliphatic hydrocarbon radical having 11 to 23 carbon atoms in the main chain,
$R_1$ represents hydrogen, an unsubstituted or substituted lower alkyl group, or an unsubstituted or substituted phenyl group,
Y represents, together with the

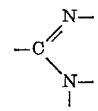

group, the radical of a partially saturated diazole, or diazine ring, and
X represents the anion of an inorganic or organic acid, and optionally a non-ionogenic and/or anion-active tenside, as well as further auxiliary agents.

In compounds of the general Formula I, R represents, as aliphatic radical having 11 to 23 carbon atoms in the main chain, a straight-chained or branched alkyl or alkenyl group which can contain as substituents, e.g. the hydroxyl group such as the undecyl, tridecyl, pentadecyl, heptadecyl, heptadec-8-enyl, 11-hydroxy-heptadec-8-enyl, nonadecyl, tricosyl, 1,3,5,7 - tetramethylundecyl or 2-butyldodecyl group. Preferably R represents a heptadecyl or heptadec-8-enyl group.

If $R_1$ represents an unsubstituted lower alkyl group, then this preferably has 1 to 4 carbon atoms and is, e.g. the methyl, ethyl, isopropyl or tert. butyl group. These alkyl groups can be substituted, e.g. by the hydroxyl, nitrile and carbamoyl group and also by carbocyclic-aromatic groups, especially the phenyl, alkylphenyl and halogenphenyl group, or they can have epoxy groups. Examples of such substituted alkyl groups are: The β-hydroxyethyl, β-cyanoethyl, β-carbamoylethyl, 1,2 - dihydroxypropyl-3-, 1,2-epoxypropyl-3-, benzyl or phenethyl group.

If $R_1$ represents a substituted phenyl group, then suitable as substituents are usual non-ionogenic ring substituents, e.g. halogens such as fluorine, chlorine or bromine, alkyl and alkoxy groups having 1 to 4 carbon atoms such as the methyl, ethyl, methoxy, ethoxy or butoxy group.

Y together with the group

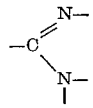

is preferably the Δ²-imidazoline or the Δ²-tetrahydropyrimidine group

As anion of an inorganic acid, X represents, e.g. a chloride, bromide, iodide, sulphate or phosphate ion. As anion of an organic acid, X represents, e.g. a benzene sulphonate, toluene sulphonate, formate, acetate, propionate, hydrogen oxalate, hydrogen succinate or hydrogen phthalate ion. Anions derived from polybasic acids can form the salt with more than 1 stoichiometric portion of cation.

Compounds of the general Formula I are for the most part known or they can be produced by methods known per se. Compounds of the Formula I, wherein Y together with the

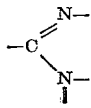

group form a Δ²-imidazoline or Δ²-tetrahydropyrimidine group are obtained, for example, by heating a fatty acid with 1,2-diaminoethane or 1,3-diaminopropane, or their salts, to temperatures above 200° C., preferably to 240–260° C.

Suitable as reactive dyestuffs for the process according to the invention are, advantageously, anionic water-soluble dyestuffs. Dyestuffs are preferred, the anionic character of which is governed by metal complex formation alone and/or by acid salt-forming substituents. Examples of such acid groups are carboxylic acid groups, acid sulphuric acid and phosphoric acid ester groups, phosphoric acid groups, acylated sulphonic acid imide groups such as alkyl or aryl disulphimide or alkyl or aryl carbonylsulphimide groups and, in particular, sulphonic acid groups. Especially good results are in general obtained with dyestuffs having at least one sulphonic acid group.

The reactive dyestuffs can belong to very diverse classes of dyestuffs, and can be, e.g. oxazine, triphenylmethane, xanthene, nitro, acridone, stilbene, perinone, peridicarboxylic acid imide, quinophthalone, naphthoquinone imine and phthalocyanine dyestuffs, chiefly however acid anthraquinone and anionic azo dyestuffs. The latter can be metal-free, metallisable or heavy-metal-containing mono, bis and polyazo dyestuffs, including the 1:2 chromium or cobalt complex compounds containing two identical or different molecules of azo dyestuff complexed with a chromium or cobalt atom, and the copper or nickel containing formazan dyestuffs providing they have substituents able to form with the polyamide fibres a covalent bond. These reactive groups can be bound directly or by way of bridge members such as oxygen, sulphur, an imino, methyleneimino, carbonylimino, sulphonylimino or ureylene groups, whereby the imino hydrogen can be substituted by a methyl group, to the chromophoric framework of the dyestuff, preferably to an aromatic ring.

Examples of such reactive groups are: epoxy groups, ethyleneimino groups, isocyanate and isothiocyanate groups, carbamic acid aryl ester groups, the radical of an acid having at least one mobile halogen atom and/or a multiple bond capable of addition, e.g. the radical of chloro- or bromoacetic acid, β-chloro- and β-bromopropionic acid, α,β-dibromopropionic acid, tetrahalogen cyclobutane carboxylic acid such as 2-chloro-2-fluoro-3,3-difluoro- or 2,2,3,3-tetrafluoro-cyclobutane-1- carboxylic acid, propiolic acid, acrylic acid, methacrylic acid, α-chloro-, β-chloro-, α-bromo- and β-bromo-acrylic acid, α,β- and β,β-dichloro- or -dibromoacrylic acid, trichloro- or tribromoacrylic acid, 2-(2,2,3,3-tetrafluorocyclobutyl-1)-acrylic acid, crotonic acid, α- or β-chloro- or -bromocrotonic acid, α,β-dichlorocrotonic acid, maleic acid, monochloro- and monobromomaleic acid, dichloro- and dibromomaleic acid, fumaric acid, monochloro- and monobromofumaric acid, dichloro- and dibromofumaric acid, fumaric acid monoester, dichloro- and dibromosuccinic acid, vinylsulphonic acid, β-chlorovinylsulphonic acid or a nitrohalogen benzoic acid or nitrohalogen benzene sulphonic acid with a mobile halogen atom, especially with fluorine or chlorine in o- or p-position to the nitro group, such as the radical of the 3-nitro-4-fluorobenzoic acid or 3-nitro-4-fluorobenzenesulphonic acid. Also β-hydroxyalkylsulphonyl, -sulphonamido or -carbonamido groups, esterified with strong acids, such as the β-halogenethylsulphonyl, β-sulphatoethylsulphonyl, β-sulphatoethylsulphamoyl, β-sulphatoethyl-N-methyl-sulphonamido or β-sulphatopropionamido group, the β-alkyl- or β-phenylsulphonylalkyl-sulphonyl, -sulphonamido or -carbonamido group, e.g. the β-phenylsulphonylpropionamido group. Preferably, the reactive group consists of the radical of an aromatic nitrogen heterocycle having advantageously more than one hetero atom in the ring, which has at least one mobile halogen atom such as fluorine, chlorine or bromine, or an acryloyl-, N-hydroxymethyleneamino, sulphonic acid or alkyl-sulphonyl group on a ring carbon atom.

Examples of suchlike reactive groups are: the triazinyl or diazinyl radical having at least one mobile halogen atom, e.g. the radical of cyanuric chloride, cyanuric bromide or their primary condensation products, whereby a halogen atom is replaced by the optionally further substituted radical of a primary or secondary aliphatic, alicyclic, aromatic or heterocyclic amine, especially by aniline or its alkyl and sulphonic acid or carboxylic acid derivatives, by lower mono and dialkylamines, as well as by ammonia, or by the radical of an aliphatic, alicyclic, aromatic or heterocyclic hydroxy or thiol compound; or the di- or trihalogenpyrimidyl radical such as the 2,4-di- or especially 2,4,5-trichloro-, -bromo-, -fluoro-, 5-bromo- or 5-chloro-2,4-difluoro- or 5-bromo-2,4-dichloropyrimidyl-6-radical. The dihalogenpyrimidyl radical can carry in 5-position, e.g. the following substituents: methyl, ethyl, carboxylic acid or sulphonic acid amide optionally substituted at the nitrogen atom, carboxylic acid methyl or ethyl ester, acyl, e.g. benzoyl, alkenyl, e.g. allyl, chlorovinyl, substituted alkyl, e.g. carboxymethyl, chloro- or bromomethyl.

Further suitable reactive groups are, e.g. the radical of a dihalogenpyrimidine carboxylic acid, the 2,3-dihalogenquinoxaline carboxylic acid or sulphonic acid, the 2-halogen- or 2-methylsulphonyl-benzothiazole or -oxazole carboxylic acid or sulphonic acid, the 1,4-dihalogenphthalazine carboxylic acid, the 2,4-dihalogenquinazoline carboxylic acid or the 4,5-dihalogen-6-pyridazon-1-yl-alkylene or -phenylene carboxylic acid, such as the acid radicals of the 2,4-difluoro- or 2,4-dichloropyrimidine-5- or -6-carboxylic acid, 2,4-dichloro-6-chloromethyl-pyrimidine-5-carboxylic acid, 2,3-difluoro- or 2,3-dichloro-quinoxaline-6-carboxylic acid or -6-sulphonic acid, 2-chlorobenzothiazole or -oxazole-5- or -6-carboxylic acid or -5- or -6-sulphonic acid, 1,4-difluoro-, 1,4-dichloro- or 1,4-dibromophthalazine-6-carboxylic acid or -6-sulphonic acid, 2,4-dichloroquinazoline-6- or -7-carboxylic acid, 2,3-dichloroquinoxaline-7-carboxylic acid or -7-sulphonic acid, 4,5-dichloro-6-pyridazon-1-yl-trimethylene carboxylic acid or -1',4'-phenylene carboxylic acid.

Mentioned as further reactive groups are: trichloropyridazinyl, dichloro - 1,2,4 - triazinyl, 3-chloropyridazine-6-carboxylic acid, 5-chloro-1,2,4-thiadiazol-3-yl-1',4'-phenylene carboxylic acid, allylsulphone and allylsulphide radicals. Mention is also made of "onium dyestuffs," which have, e.g. in place of a reactive halogen atom or an ester group, a reactive ammonium, quinuclidinium, pyridinium, hydrazinium or sulphonium radical.

Especially convenient for the process according to the invention are dyestuffs, the reactive groups of which are derived from halogenpyrimidines or from halogenpyrimidine carboxylic acids; examples of these are: the 2,4-di- or especially 2,4,5-trichloro-, -bromo-, -fluoro-, 5-bromo- or 5-chloro-2,4-difluoro- or 5-bromo-2,4-dichloropyrimidyl-6- group or the 2,4-dibromo-, 2,4-difluoro- or 2,4-dichloropyrimidine-5- or -6-carbonyl group.

The reactive dyestuffs can be partially present as free acids but usually they are the corresponding alkali salts, e.g. lithium, sodium, potassium salts or ammonium salts.

Besides the defined compounds of the general Formula I, the aqueous preparation, usable according to the invention, can also contain one or more non-ionogenic and/or anion-active tensides. The addition of such like non-ionogenic and/or anion-active tensides is especially advisable when dyeing is being performed using the exhaust process, as this produces a stabilisation of the complex formed by dyestuff and auxiliary agents in the dye bath.

Suitable as anion-active tensides are, e.g. sulphated addition products of 1 to 10 moles of ethylene oxide with higher fatty acids, higher aliphatic alcohols and alkylphenols, the alkyl chain of which contains 8 to 20 carbon atoms, e.g. sulphated monoesters of stearic or oleic acid with penta-, hepta- or decaethylene glycol, sulphated tri-, penta-, hepta- or decaethylene glycol-mono-lauryl, -myristyl, -stearyl or -oleyl ethers or sulphated mono- or diethylene glycol-mono-nonylphenyl ethers or pentaethylene glycol monododecylphenyl ethers, also alkylsulphonates having 10 to 20 carbon atoms in the alkyl chain, alkylbenzenesulphonates with a straight or branched alkyl chain having 8 to 20 carbon atoms in the alkyl chain such as nonylbenzenesulphonate, 1,3,5,7 - tetramethyl-octylbenzenesulphonate or octadecylbenzene sulphonate, as well as alkyl naphthalene sulphonates, e.g. bis-naphthylmethane sulphonates or sulphosuccinates, e.g. sodium dioctylsulphosuccinate.

Preferred however are non-ionogenic tensides, e.g. polyglycol ethers of alkylated phenols having at least 7 carbon atoms in the alkyl chain and 4 to 30 alkyleneoxy groups such as penta- or decaethylene glycol mononylphenyl ethers, penta- decaethylene glycol mono-di-iso-octylphenyl ether, also N-acylated alkanolamines, such as the N,N-bis-$\beta$-hydroxyethylamides of N-$\gamma$-hydroxypropylamides of higher fatty acids having 10 to 20 carbon atoms such as those of lauric acid, myristic acid, palmitic acid, stearic acid or oleic acid or the coconut oil fatty acid mixture, particularly however alkylpolyglycol ethers having 10 to 18 carbon atoms in the alkyl chain and 5 to 20 ethyleneoxy groups such as penta, hepta, deca, pentadeca or eicosane-ethylene glycol-mono-lauryl, -stearyl or -oleyl ethers. Also suitable are basic nitrogen-containing ethers such as, e.g. products obtainable by the reaction of 1 mole of an amine with 3 to 100 moles of an alkylene oxide, e.g. the reaction product of 1 mole of dodecylamine, oleylamine, stearylamine, N-monoalkylpropylenediamine, the alkyl radical of which is unbranched and contains 16 to 18 carbon atoms, or monostearyl diethylenetriamine with 3, 4, 6, 8, 16 or over 30 moles of ethylene oxide.

Particularly advantageous is, moreover, an addition of water-soluble, basic nitrogen-containing aldehyde condensation products which are advantageously derived from lower aliphatic aldehydes and ammonia or lower amines. The preferred condensation product is hexamethylene tetramine.

In addition to the compounds required according to the invention, the aqueous preparations can also contain further additions common in the dyeing and printing industry such as, e.g. thickening agents, electrolytes, acids, bases, urea, thiourea, thiodiethylene glycol and hydrophilic compounds having limited solubility in water such as, e.g. butyl or benzyl alcohol. To the aqueous treatment solution can also be added compounds which accelerate the reaction between dyestuff and fibre, such as tertiary amines or hydrazine compounds having at least one tertiary nitrogen atom. In consequence of this, for example, the reaction temperatures can be lowered and/or more deeply coloured dyeings and printings obtained or the hydrolysis stability of sensitive reactive dyestuffs can be increased. Suitable as further additions are textile protective agents with affinity to fibres, which protect the textile material to be dyed from attack by textile pests.

The amounts of the substances to be added to the dye baths in the process according to the invention, can vary within comparatively wide limits. The amount of the dyestuff depends on the desired strength of colour and, in general, it is between 0.1 and 8% relative to the weight of fibre. The compound of the general Formula I, the non-ionogenic or anion-active tensides and also further auxiliary agents are, in general, each used in amounts of 0.01 to 4% relative to the weight of fibre. Preferably however, amounts of 0.1 to 1.5% of each substance are used.

For carrying out the process it is also possible, however, to produce suitable stable preparations. These are characterised by a content of 1 part of a compound of the general Formula I, 0.5 to 4 parts, preferably 1 part of a non-ionogenic tenside, especially an alkylpolyglycol ether, 0 to 4 parts of an aldehyde condensation product containing basic nitrogen, particularly hexamethylene tetramine and 1 to 4 parts of an organic acid, in particular 80% acetic acid. The amount used of such a preparation is approximately such that—calculated on the amount of fibre material—the dyebath contains about 0.2 to 4%.

As natural polyamide fibres which can be dyed or printed using the present invention are silk, hair and preferably wool. Suitable as synthetic polyamide fibres are, e.g. condensation products from hexamethylenediamine and adipic acid (nylon 6.6) or sebacic acid (nylon 6.10) or mixed condensation products, e.g. from hexamethylenediamine, adipic acid and $\epsilon$-caprolactam (nylon 6.6/6), also the polymerisation products from $\epsilon$-caprolactam, known under the trade names "nylon 6," "Perlon," "Grilon" or "Enkalon," or from $\omega$-aminoundecanoic acid (nylon 11 or "Rilsan"). These fibres can be used at any stage of processing, e.g. in the form of threads, yarn, knitted goods and fabrics or, in the case of wool, hair and silk, also in the loose form.

Particularly advantageous is the process for the dyeing of wool, optionally in admixture with other nitrogen-containing or nitrogen-free fibres.

The natural and synthetic polyamide fibre material can be dyed or printed according to the invention and in a manner known per se, both by the exhaust process and also continuously by impregnating with the dye liquor and subsequent heat treatment. A preferred embodiment is the dyeing by means of the exhaust process, advantageously in short dye liquors with a ratio of liquid to material of about 1:5 to 1:40 and with a pH value of approximately 2.6-6, preferably 4-6. Advantageously, the material to be dyed is pretreated in the dye liquor without dyestuff for about 10 minutes at 40° C. The dyestuff is then added, the temperature of the dye bath is raised within 15 to 30 minutes to boiling temperature and dyeing proceeds at this temperature for 45 to 90 minutes. Very even dyeings are obtained using this method of dyeing in any desired depth of colour with a good dyeing yield. If the fibre material is dyed or printed continuously, then an addition is advantageously made to the dye liquor or printing paste—with suitable adaptation of the recipes—of the usual thickeners such as etherified or esterified locust bean flour compounds and/or dye carriers. Impregnation of the fibre material is generally performed by coating, spraying or printing, chiefly however by padding. The impregnated fibre material is squeezed out to obtain the desired dye liquor content (ca. 40 to 130% dye liquor absorption relative to the dry weight of the material) and, without intermediate drying, it is subjected to a heat treatment, especially steaming. Steaming is advantageously performed with neutral saturated steam. Wool and silk are thereby steamed at ca. 90 to 110° C. and synthetic polyamide at 90 to 140° C. The dyeings or printings are subsequently rinsed and dried in the usual manner.

It is possible, using the process according to the invention, to produce fast and even dyeings of fabrics and knitted goods made from natural and synthetic polyamide fibres. The dyeings produced according to the invention are characterised by excellent uniformity, very good reproducibility and very good dye yield.

The temperatures are given in degrees centigrade in the following examples.

EXAMPLE 1

0.4 g. of the dyestuff of the formula

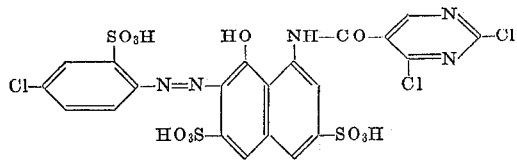

are dissolved in 100 ml. of water and added to a dye bath consisting of 880 ml. of water, 0.3 g. of a tetrahydropyrimidine compound of the formula

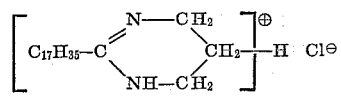

1 g. of the reaction product of 1 mole of cetyl alcohol with 18 moles of ethylene oxide, 1 ml. of 85% formic acid, 10 g. of sodium sulphate and 5 g. of ammonium sulphate.

After thorough mixing of the constituents, 100 g. of well pre-wetted wool yarn are introduced at 90° into the dye bath. The material is treated for 15 minutes at 85 to 90°, the dye bath is then heated within 15 minutes to boiling, and dyeing proceeds for 60 minutes at 95 to 98°. The yarn is subsequently rinsed with water at 30° and dried. With appreciable exhaustion of the dye bath, and even, non-skittery, brilliant red dyeing is obtained having good fastness properties. If the pyrimidine compound and the glycol ether are omitted in working according to the above described procedure, then only a weakly coloured, skittery dyeing is obtained with the fibres being dyed in uneven shades.

The pyrimidine compound used in this example is obtained, for example, as follows:

270 g. of stearic acid are melted in a flask at 60° and 103 g. of 1,3-diaminopropane-dichlorohydrate are added. 103 g. of 1,3-diaminopropane are then added dropwise to the suspension within 2 hours, whereby the internal temperature increases to 125°. When the addition is completed, the reaction mixture is heated within 3½ hours to 260° with condensation of the formed water on the descending condenser. After cooling to room temperature, the formed 2-heptadecyl tetrahydropyrimidine chlorohydrate solidifies in the form of a solid, wax-like substance, which dissolves in water to give a clear solution.

Similarly good dyeings are obtained by using in this example, instead of the above reactive dyestuff, the same amounts of the reactive dyestuffs given in column 2 of the following Table I, with the procedure being otherwise as described in the example. The shades of the obtained dyeings are given in the last column of the table.

TABLE I

| Ex. | Dyestuff | Shade on wool |
|---|---|---|
| 2 | (structure shown) | Yellow. |
| 3 | (structure shown) | Do. |
| 4 | (structure shown) | Red. |
| 5 | 1:2 chromium complex containing 1 molecule of each of the two dyestuffs (structures shown) | Orange. |

TABLE I—Continued

| Ex. | Dyestuff | Shade on wool |
|---|---|---|
| 5 Cont. | and 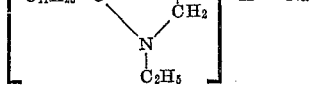 bound to a metal atom, | |
| 6 | 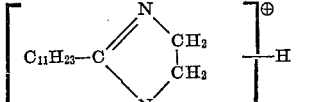 | Greenish yellow. |

Similarly good results are obtained by using in the Examples 1–6, in place of the tetrahydropyrimidine compound, the same amounts of the nitrogen-containing compounds given in column 2 of the following Table II, with the procedure being otherwise as stated in the example.

TABLE II

| Example | Nitrogen-containing compound |
|---|---|
| 7 | 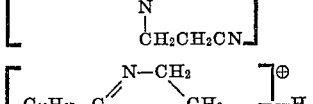 |
| 8 | |
| 9 | |
| 10 | |
| 11 | |
| 12 | |
| 13 | 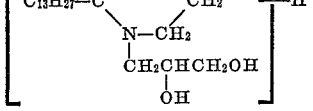 |
| 14 | |

EXAMPLE 15

20 g. of well pre-washed wool flannel are introduced into a dye bath consisting of 500 ml. of water at 40°, 0.6 ml. of 40% acetic acid, 0.2 g. of an imidazoline compound of the formula

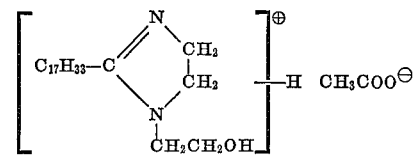

0.2 g. of the reaction product from 1 mole of cetyl alcohol with 18 moles of ethylene oxide and 0.2 g. of hexamethylene tetramine, and the fabric is treated for 15 minutes at 40°. The solution of 0.4 g. of the dyestuff of the formula

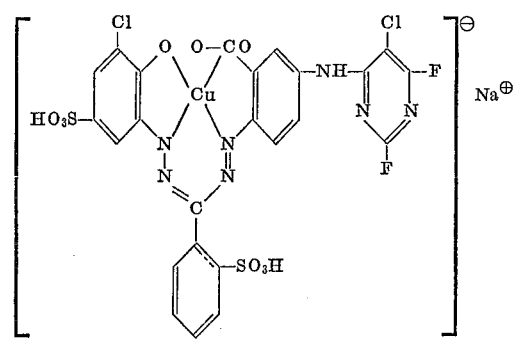

disolved in 100 ml. of water, is then added and the material treated for a further 10 minutes at 40°. The dye liquor is then heated to boiling within 45 minutes, whereupon dyeing proceeds for 60 minutes at the boiling temperature. The material is then rinsed hot and cold and dried. In this manner is produced a pure, non-skittery, blue dyeing which is fast to rubbing.

By using in the above example, instead of the stated 0.2 g. 0.1 of the imidazoline compound, instead of the stated 0.2 g. 0.1 g. of the polyglycol ether and instead of the stated 0.2 g. 0.05 g. hexamethylene tetramine, with the working procedure being otherwise the same, blue dyeings on wool are obtained with similarly good fastness properties.

If the imidazoline compound and the polyglycol ether are omitted in working according to the above described procedure, then a weakly coloured and skittery dyeing is obtained.

Equally good results are obtained using pre-chromed wool material free of felt instead of the wool flannel used.

The imidazoline compound used in this example if obtained, for example, as follows:

132 g. of N-β-hydroxyethyl ethylenediamine are added dropwise within 15 minutes at 75 to 80°, while stirring, to 282.4 g. of oleic acid, whereby the internal temperature increases to 105° and a very viscous reaction mixture is formed. With condensation of the reaction water forming on a descending condenser, the temperature is raised within 2 hours to 200 to 210°. The temperature is then allowed to fall to 150°, the reaction vessel is slowly evacuated down to a pressure of 12 torr and the temperature again raised within 2½ hours to 240°. A further half an hour is allowed at 240 to 250° for the reaction to be completed. After the reaction has ended, the heating bath is removed and the reaction mixture allowed to cool, whereby the reaction product solidifies to form a wax-like substance. By this means are obtained 325 g. of 1-β-hydroxyethyl-2-heptadec-8-enyl-imidazoline, B.P.$_{0.002}$: 223 to 230°.

By adding the equivalent amount of acetic acid to the obtained reaction product, 1-β-hydroxyethyl-2-heptadec-8-enyl-imidazoline acetate used in the above example is obtained.

By using in the above example, instead of the stated imidazoline compound, the same amounts of the nitrogen-containing compounds given in column 2 of the following Table III and, instead of the polyglycol ether same amounts of the auxiliary agents listed in column 3, with the working procedure being otherwise the same, blue dyeings on wool are obtained with similarly good results.

TABLE III

| Example | Nitrogen-containing compounds | Auxiliary agents |
|---|---|---|
| 16 | 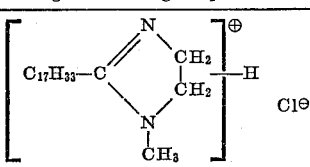 | Coconut oil fatty acid diethanolamide. |
| 17 | 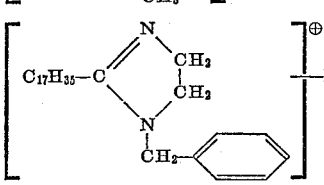 | Do. |
| 18 | 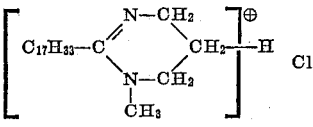 | Reaction product from 1 mole of octylphenol and 11 moles of ethylene oxide. |
| 19 | 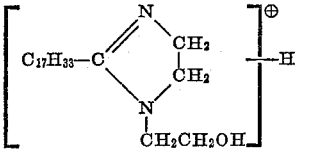 | Do. |
| 20 | 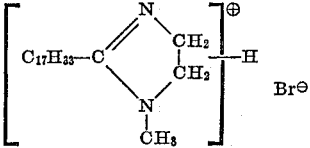 | Do. |
| 21 | 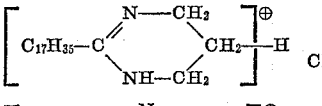 | Reaction product from 1 mole of octylalcohol and 17 moles of ethylene oxide. |
| 22 | 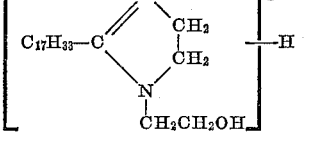 | Do. |

TABLE III—Continued

| Example | Nitrogen-containing compounds | Auxiliary agents |
|---|---|---|
| 23 | $\left[ C_{17}H_{35}-C \begin{array}{c} N \\ \diagdown \\ N \\ | \\ CH_2CH_2OH \end{array} \begin{array}{c} CH_2 \\ | \\ CH_2 \end{array} -H \right]^{\oplus} Cl^{\ominus}$ | Reaction product from 1 mole of cetyl alcohol with 18 moles of ethylene oxide. |
| 24 | $\left[ C_{17}H_{33}-C \begin{array}{c} N \\ \diagdown \\ N \\ | \\ CH_2CH_2OH \end{array} \begin{array}{c} CH_2 \\ | \\ CH_2 \end{array} -H \right]^{\oplus} Cl^{\ominus}$ | Do. |
| 25 | $\left[ C_{17}H_{33}-C \begin{array}{c} N \\ \diagdown \\ N \\ | \\ CH_2CH_2OH \end{array} \begin{array}{c} CH_2 \\ | \\ CH_2 \end{array} -H \right]^{\oplus} Na_2PO_4^{\ominus}$ | Do. |
| 26 | $\left[ C_{17}H_{33}-C \begin{array}{c} N \\ \diagdown \\ N \\ | \\ C_6H_4{-}CH_3 \end{array} \begin{array}{c} CH_2 \\ | \\ CH_2 \end{array} -H \right]^{\oplus} CH_3COO^{\ominus}$ | Do. |

EXAMPLE 27

20 g. of well pre-wetted wool flannel are introduced into a dye bath consisting of 800 ml. of water at 40°, 0.6 ml. of 40% acetic acid, 0.05 g. of an imidazoline compound of the formula $$\left[ C_{17}H_{33}-C \begin{array}{c} N \\ \diagdown \\ N \\ | \\ H \end{array} \begin{array}{c} CH_2 \\ | \\ CH_2 \end{array} -H \right]^{\oplus} HCOO^{\ominus}$$

and 0.1 g. of triethyleneglycol monolauryl ether sulphate, and the fabric is treated for 15 minutes at 40°. The solution of 1.0 g. of the dyestuff of the formula

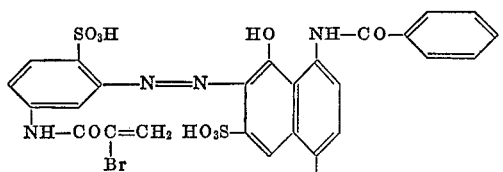

dissolved in 100 ml. of water, is then added and the material treated for a further 10 minutes at 40°. The dye liquor is then heated to boiling within 45 minutes, whereupon dyeing proceeds for 60 minutes at the boiling temperature. The material is then rinsed hot and cold and dried. In this manner is produced a scarlet, even dyeing having good fastness properties.

Without addition of the above imidazoline compound to the dye bath, the produced dyeings are weakly coloured and skittery.

Similar results are obtained if nylon 6.6-fabric is used in place of wool flannel.

The imidazoline compound used in this example is obtained, for example, by reaction of equivalent amounts of oleic acid with ethylenediamine chlorohydrate instead of 282.4 g. of oleic acid and 132 g. of N-β-hydroxyethyl ethylenediamine under the conditions described in Example 15.

EXAMPLE 28

100 g. of woollen slubbing are impregnated on a horizontal 2-roller padding mangle with a dye liquor at 50° containing 10 ml./l. of formic acid, 10 g./l. of etherified locust bean flour, 5 g./l. of sodium dioctyl sulphosuccinate, 10 g./l. of the dyestuff of the formula

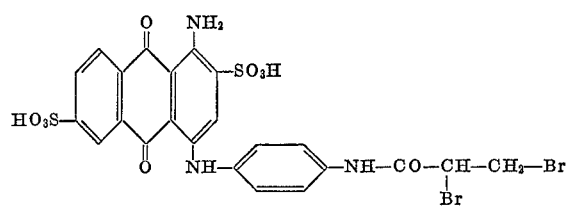

and 10 g./l. of an imidazoline compound of the formula $$\left[ C_{17}H_{35}-C \begin{array}{c} N \\ \diagdown \\ N \\ | \\ CH_2CH_2OH \end{array} \begin{array}{c} CH_2 \\ | \\ CH_2 \end{array} -H \right]^{\oplus} CH_3{-}C_6H_4{-}SO_3^{\ominus}$$

The material is squeezed out to 100% liquor absorption and, without drying, steamed for 30 minutes at ca. 102° and subsequently washed. The dyestuff is well fixed. In this manner is obtained a brilliant blue dyeing without any sandwich effect.

Without the addition of the above imidazoline compound to the impregnating liquor, a clearly paler dyeing is obtained exhibiting a sandwich effect.

EXAMPLE 29

1.8 g. of the dyestuff of the formula

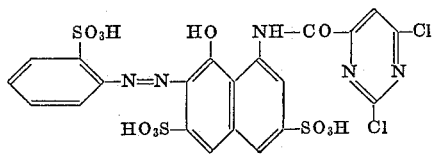

are dissolved together with 0.05 g. of the imidazoline compound of the formula

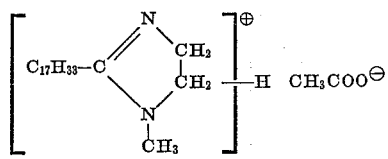

1 g. of dibutylphenoldecaglycol ether, 1 ml. of 85% formic acid, 10 g. of sodium sulphate and 5 g. of ammonium sulphate in 800 ml. of water at 90°. After the constituents have dissolved, 60 g. of wool yarn are introduced into the dye bath and, after a 15 minute treatment at 85 to 90°, the dye bath is heated to boiling. While boiling, dyeing then proceeds for 60 minutes. An even, non-skittery, red dyeing is obtained having good fastness properties.

Without the addition of the imidazoline compound, with the procedure being otherwise as specified above, a weakly coloured and skittery dyeing is obtained.

The imidazoline compound used in this example is obtained, for example, by reaction of equivalent amounts of oleic acid and N-methylethylenediamine instead of 282.4 g. of oleic acid and 132 g. of N-β-hydroxyethylethylenediamine, under the conditions described in Example 15.

By using in the above example, instead of the stated 0.05 g. 0.18 g. of the imidazoline compound and instead of the stated 1 g. 0.3 g. dibutylphenoldecaglycol ether with the working procedure being otherwise the same, red dyeings on wool are obtained with similarly good fastness properties.

We claim:

1. In a process for the coloring of natural and synthetic polyamide fibers by the exhaustion or the pad dyeing process, the improvement comprising treating said fibers with an aqueous dye liquor containing an anionic reactive dyestuff and a component selected from
   (a) a compound of the formula

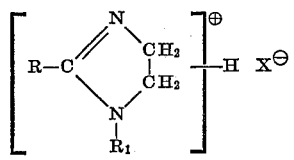

wherein
R represents an aliphatic hydrocarbon radical having 11 to 23 carbon atoms in the main chain,
$R_1$ represents hydrogen, an unsubstituted or substituted lower alkyl group, or an unsubstituted or substituted phenyl group, and
X represents the anion of an inorganic or organic acid; and
(b) a dye assistant composition consisting essentially of
  (1) the aforesaid compound defined under (a)
  (2) a non-ionogenic tenside, and
  (3) a lower aliphatic carboxylic acid;
said compound (a) being present in an amount of at least 0.01%, and said dye assistant composition being present in an amount of 0.2 to 4%, calculated on the weight of the fibers.

2. In a process for the coloring of natural and synthetic polyamide fibers by the exhaustion or the pad dyeing process, the improvement comprising treating said fibers with an aqueous dye liquor containing an anionic reaction dyestuff and a compound of the formula

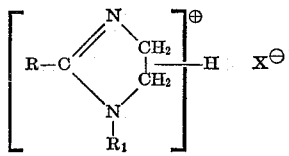

wherein
R represents an aliphatic hydrocarbon radical having 11 to 23 carbon atoms in the main chain,
$R_1$ represents hydrogen, an unsubstituted or substituted lower alkyl group, or an unsubstituted or substituted phenyl group, and
X represents the anion of an inorganic or organic acid;
said compound being present in an amount of at least 0.01% calculated on the weight of the fibers.

3. A process as defined in claim 1, wherein said natural polyamide fibres are wool.

4. A process as defined in claim 1, wherein said fibres are synthetic polyamide fibres.

5. A process as defined in claim 1, wherein said non-ionogenic tenside is an alkylpolyglycol ether having 10 to 18 carbon atoms in the alkyl chain and 5 to 20 ethyleneoxy groups.

6. A process according to claim 1, wherein said fibers are treated in an exhaustion process, the fiber material being first pretreated in the dye liquor containing the compound (a) or the dye assistant composition (b) for about 10 minutes at 40° C. and then subjected to exhaustion dyeing.

7. A process as defined in claim 6, wherein said anionic reactive dyestuff contains a halogen-substituted pyrimidine or pyrimidine carboxylic acid radical.

8. A process as defined in claim 1, wherein, in said compound (a), R is a heptadecyl or heptadecenyl radical.

9. A process as defined in claim 8, wherein said compound is 1-β-hydroxyethyl - 2 - heptadecenyl-imidazoline acetate.

10. A process as defined in claim 8, wherein said compound is 1-β-hydroxyethyl - 2 - heptadecyl-imidazoline hydrochloride.

11. A process as defined in claim 8, wherein said compound is 2-heptadencyl-imidazoline formiate.

12. A process as defined in claim 8, wherein said compound is 1-methyl-2-heptadencyl-imidazoline acetate.

13. A dye liquor for the coloring of natural and synthetic polyamide fibers comprising an anionic reactive dyestuff and a dye assistant composition consisting essentially of
  (a) a compound of the formula

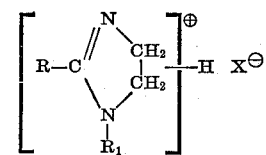

wherein
R represents an aliphatic hydrocarbon radical having 11 to 23 carbon atoms in the main chain,
$R_1$ represents hydrogen, an unsubstituted or substituted lower alkyl group, or an unsubstituted or substituted phenyl group; and
X represents the anion of an inorganic or organic acid;
  (b) a non-ionogenic tenside; and
  (c) a lower aliphatic carboxylic acid.

14. A dye liquor defined in claim 13, wherein, in said compound (a), R is heptadecyl or heptdecenyl radical.

15. A dye liquor as defined in claim 14, wherein said compound is 1-β-hydroxyethyl-2-heptadecenyl-imidazoline acetate.

16. A dye liquor as defined in claim 14, wherein said compound is 1-β-hydroxyethyl-2-heptadecyl - imidazoline hydrochloride.

17. A dye liquor as defined in claim 14, wherein said compound is 1-methyl-2-heptadecenyl-imidazoline acetate.

18. A dye liquor as defined in claim 14 wherein said compound is 2-heptadecenyl-imidazoline formiate.

References Cited

UNITED STATES PATENTS

| | | | |
|---|---|---|---|
| 3,096,139 | 7/1963 | Hindle | 8—21 |
| 3,391,985 | 7/1968 | Zurbuchen et al. | 8—174 X |

GEORGE F. LESMES, Primary Examiner

T. J. HERBERT, Jr., Assistant Examiner

U.S. Cl. X.R.

8—84; 163